United States Patent
Chazal

(10) Patent No.: US 8,839,608 B2
(45) Date of Patent: Sep. 23, 2014

(54) METHOD OF CONTROLLING AN INTERNAL COMBUSTION ENGINE AND CORRESPONDING INTERNAL COMBUSTION ENGINE

(75) Inventor: Yann Chazal, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 270 days.

(21) Appl. No.: 13/127,570

(22) PCT Filed: Oct. 28, 2009

(86) PCT No.: PCT/FR2009/052079
§ 371 (c)(1),
(2), (4) Date: May 4, 2011

(87) PCT Pub. No.: WO2010/061085
PCT Pub. Date: Jun. 3, 2010

(65) Prior Publication Data
US 2011/0213542 A1    Sep. 1, 2011

(30) Foreign Application Priority Data
Nov. 26, 2008 (FR) ..................... 08 06647

(51) Int. Cl.
F01N 3/00 (2006.01)
F01N 9/00 (2006.01)
F02D 41/02 (2006.01)
F02D 41/14 (2006.01)

(52) U.S. Cl.
CPC ............. *F02D 41/029* (2013.01); *F01N 9/002* (2013.01); *F02D 2200/0812* (2013.01); *F02D 41/1467* (2013.01); *Y02T 10/47* (2013.01)
USPC ..................... 60/295; 60/274; 60/276; 60/285

(58) Field of Classification Search
USPC ................... 123/479; 701/102, 103, 107, 114; 73/114.69, 114.75; 60/277, 286, 287, 60/292, 295, 297, 303, 311; 702/182, 183, 702/185
See application file for complete search history.

(56) References Cited

U.S. PATENT DOCUMENTS 4,389,706 A * 6/1983 Gomola et al. ............. 700/1
4,719,751 A * 1/1988 Kume et al. ................. 60/285

(Continued)

FOREIGN PATENT DOCUMENTS

EP    1 195 508    4/2002
EP    1 519 020    3/2005

(Continued)

OTHER PUBLICATIONS

International Search Report issued Mar. 12, 2010 in PCT/FR09/52079 filed Oct. 28, 2009.

*Primary Examiner* — Erick Solis
*Assistant Examiner* — Carl Staubach
(74) *Attorney, Agent, or Firm* — Oblon, Spivak, McClelland, Maier & Neustadt, L.L.P.

(57) ABSTRACT

A method of controlling an internal combustion engine that includes an exhaust line fitted with a particulate filter, the method including: a) acquiring a charge parameter relating to a fill level of the particulate filter, b) comparing the charge parameter with at least one determined threshold, and c) bringing the internal combustion engine to a set operating point determined as a function of various criteria of differing levels of importance. Prior to c) and with one of the criteria being the mass flow rate of particles entering the particulate filter, a constraint level coefficient is determined as a function of the result of the comparing b) and applied to the particulate mass flow rate to weight importance of this criterion in determining the engine operating point. Thus, the engine is controlled taking account of the fill level of the particulate filter, making it possible to optimize a compromise between constraint on the particulate flow rate through the exhaust line and other engine control constraints.

13 Claims, 3 Drawing Sheets

(56) References Cited

U.S. PATENT DOCUMENTS

| | | | |
|---|---|---|---|
| 5,337,556 A * | 8/1994 | Aihara | 60/276 |
| 6,032,461 A * | 3/2000 | Kinugasa et al. | 60/295 |
| 6,408,686 B1 * | 6/2002 | Tallio et al. | 73/114.69 |
| 6,910,329 B2 * | 6/2005 | Bunting et al. | 60/297 |
| 7,028,466 B2 * | 4/2006 | Kondou et al. | 60/295 |
| 7,200,991 B2 * | 4/2007 | Otake et al. | 60/311 |
| 7,685,814 B2 * | 3/2010 | Zhang et al. | 60/295 |
| 8,127,536 B2 * | 3/2012 | Hosaka | 60/295 |
| 8,281,572 B2 * | 10/2012 | Chi et al. | 60/286 |
| 8,281,574 B2 * | 10/2012 | Yamada et al. | 60/296 |
| 2005/0056005 A1 | 3/2005 | Otake et al. | |
| 2005/0217252 A1 | 10/2005 | Sato et al. | |

FOREIGN PATENT DOCUMENTS

| | | |
|---|---|---|
| EP | 1 582 720 | 10/2005 |
| WO | 2006 111 432 | 10/2006 |

* cited by examiner

METHOD OF CONTROLLING AN INTERNAL COMBUSTION ENGINE AND CORRESPONDING INTERNAL COMBUSTION ENGINE

TECHNICAL FIELD TO WHICH THE INVENTION RELATES

The present invention relates generally to reducing the consumption of internal combustion engines.

It relates more particularly to a method of controlling an internal combustion engine comprising an exhaust line fitted with a particulate filter, comprising:
a) a step of acquiring a charge parameter relating to the fill rate of the particulate filter,
b) a step of comparing said charge parameter with at least one determined threshold,
c) a step of controlling the internal combustion engine at an operating point determined according to a number of criteria of differing levels of importance.

It also relates to an internal combustion engine equipped with a control unit suitable for implementing this control method.

TECHNOLOGICAL BACKGROUND

The anti-pollution standards generally associate a given constraint with each type of pollutant emitted by the engine (including noise).

When these standards are not too severe, it is possible to find different control methods that make it possible, for a given torque and engine speed, to satisfy these standards. It is in particular possible to find a control mode which, on the one hand, satisfies these standards, and, on the other hand, makes it possible to optimize the engine fuel consumption.

However, the standards associated with compression ignition engines (diesel) are particularly severe and require the architecture and the control systems of the internal combustion engines to be refined.

However, beyond a certain level of refinement, it is no longer possible to satisfy the anti-pollution standards by acting only on the architecture and the control systems of the engines. Also, it is necessary to provide post-treatment systems for the polluting elements (of particular filter type) to be able to find a compromise between pollutant emissions, noise and other constraints.

Simply, these post-treatment systems are costly to build, to maintain and to install in the motor vehicles. They are consequently engineered to the necessary minimum, so that the compromise between the different constraints still remains difficult to manage.

Currently, the constraints taken into account for controlling the engines are determined by considering the situation that is most unfavorable to the engine, and are therefore independent of the configuration in which the vehicles actually are (in town, on the motorway, etc.).

In the event, among the constraints currently taken into account and that make this compromise difficult to find, the charge rate of the particulate filter can be cited. It is in fact necessary to provide the possibility for regular regeneration, regardless of the configuration in which the vehicle is.

The configuration that is most unfavorable corresponds to successions of short and slow journeys, during which the engine emits a lot of particulates which cannot be burnt since the exhaust line remains cold.

The known control methods are then set up according to these worst conditions, without checking whether the vehicle is actually in these worst conditions or in more favorable conditions. This type of setting is therefore not optimized, in particular with regard to engine fuel consumption.

OBJECT OF THE INVENTION

In order to remedy the abovementioned drawback in the state of the art, the present invention proposes a novel control method, in which the current configuration of the vehicle is taken into account in real time, so that the compromise is easier to find and that it is not done to the detriment of the engine fuel consumption.

More particularly, there is proposed according to the invention a control method as defined in the introduction, in which, one of said criteria being the mass particulate flow rate entering into the particulate filter, prior to the step c), a coefficient called constraint level is determined according to the result of the step b) and applied to the mass particulate flow rate in order to weight the importance of this criterion in determining the operating point of the engine.

Thus, by virtue of the invention, the engine is controlled by taking into account the fill rate of the particulate filter, which makes it possible to improve the management of the compromise between, on the one hand, the constraint concerning the particulate flow rate in the exhaust line and, on the other hand, the other engine setting constraints.

The invention consists more specifically in evaluating in real time the severity of the constraint relating to the fill rate of the filter in order to adapt accordingly all the settings that might have a direct or indirect impact on the quantity of the particulates emitted by the cylinders into the exhaust line. In this way, if it emerges that the fill rate of the filter is low, it is possible to control the engine by prioritizing reducing its fuel consumption, even if it means that the mass particulate flow rate is high and the filter fills rapidly. On the other hand, if it emerges that the fill rate of the filter is high, it is possible to control the engine so as to prioritize reducing its particulate emissions in order to push back the time from which this fill rate will reach a critical value.

According to an advantageous characteristic of the control method according to the invention, the constraint level is also calculated according to the difference between, on the one hand, an autonomy parameter relating to the distance and/or the duration that are available to regenerate the particulate filter in favorable regeneration conditions, and, on the other hand, a probability parameter relating to the distance and/or the duration that are estimated as being necessary to find running conditions suitable for the regeneration of the particulate filter.

Thus, the autonomy parameter makes it possible to approximate the distance or the running time remaining before the critical fill rate is reached, whereas the probability parameter makes it possible to estimate (in light of past experience) the distance or the time that will definitely be necessary before being able to regenerate the filter. Consequently, it is possible to evaluate the risk of encountering filter regeneration problems and, depending on this risk, to control the engine so as to prioritize reducing its particulate emissions or reducing its fuel consumption.

Other advantageous and nonlimiting characteristics of the control method according to the invention are as follows:
the autonomy parameter is calculated according to said charge parameter and/or the average charge speed of the particulate filter and/or the distance covered since the last active regeneration of the particulate filter and/or the duration that has elapsed since the last active regeneration of the particulate filter and/or the fill rate band within which the particulate filter can be regenerated in favorable regeneration conditions;

the probability parameter is calculated according to the distance covered and/or the duration that has passed since the last instant when the running conditions were suitable for the regeneration of the particulate filter, and the average distance and/or the average duration between two instants when the running conditions are suitable for the regeneration of the particulate filter;

the probability parameter is also calculated according to the minimum threshold distance and/or the minimum threshold duration between two active regenerations of the particulate filter;

in the step b), the charge parameter is compared with at least two determined thresholds and, if the charge parameter is above the two thresholds or below the two thresholds, the constraint level is deduced directly therefrom;

on the other hand, if the charge parameter lies between two of said thresholds, the constraint level is calculated according to the autonomy and probability parameters;

each threshold has a predetermined fixed value;

as a variant, each threshold has a variable value;

said variable value is deduced from the usual conditions of use of the internal combustion engine;

the constraint level varies continuously or in levels.

It also relates to an internal combustion engine comprising cylinders, a line for the intake of fresh air into the cylinders, means of injecting fuel into the cylinders, an exhaust line for the burnt gases from the cylinders which is fitted with a particulate filter, and a unit for controlling the flow rates of fresh air and fuel injected into the cylinders, which is suitable for implementing this control method.

DETAILED DESCRIPTION OF AN EXEMPLARY EMBODIMENT

The following description, in light of the appended drawings, given as a nonlimiting example, will show what the invention consists of and how it can be produced.

The invention applies to any type of internal combustion engine discharging polluting particles that are best filtered, and more specifically to any type of internal combustion engine with compression ignition (diesel).

Such an internal combustion engine conventionally comprises an engine block provided with four cylinders.

Upstream of the cylinders, the internal combustion engine comprises an intake line which takes fresh air from the atmosphere and which brings and distributes this fresh air into each of the cylinders of the engine block. This intake line is in this case equipped with a fresh air flow rate control valve.

At the outlet of the cylinders, the internal combustion engine comprises an exhaust line for the burnt gases which collects the burnt gases that leave each of the cylinders and which discharges them into the atmosphere after having treated and filtered them. The exhaust line is to this end equipped with an oxidation catalyst designed to oxidize the polluting elements originating from the combustion of the mixture of fresh air and fuel in the cylinders, and a particulate filter designed to retain the particles and the soot originating from this combustion.

The internal combustion engine also comprises in this case a burnt gas recirculation line (also called EGR line) which originates in the exhaust line, which opens out into the intake line and which is equipped with a burnt gas flow rate control valve.

The internal combustion engine also comprises fuel injectors which open into the cylinders of the internal combustion engine. As a variant, it is also obviously possible to provide for these fuel injectors to open out upstream of the cylinders, into the intake line.

The internal combustion engine finally comprises a control unit designed to control the various members of the engine, in particular in this case the burnt gas and fresh air flow rate control valves and the fuel injectors.

Figure 2:
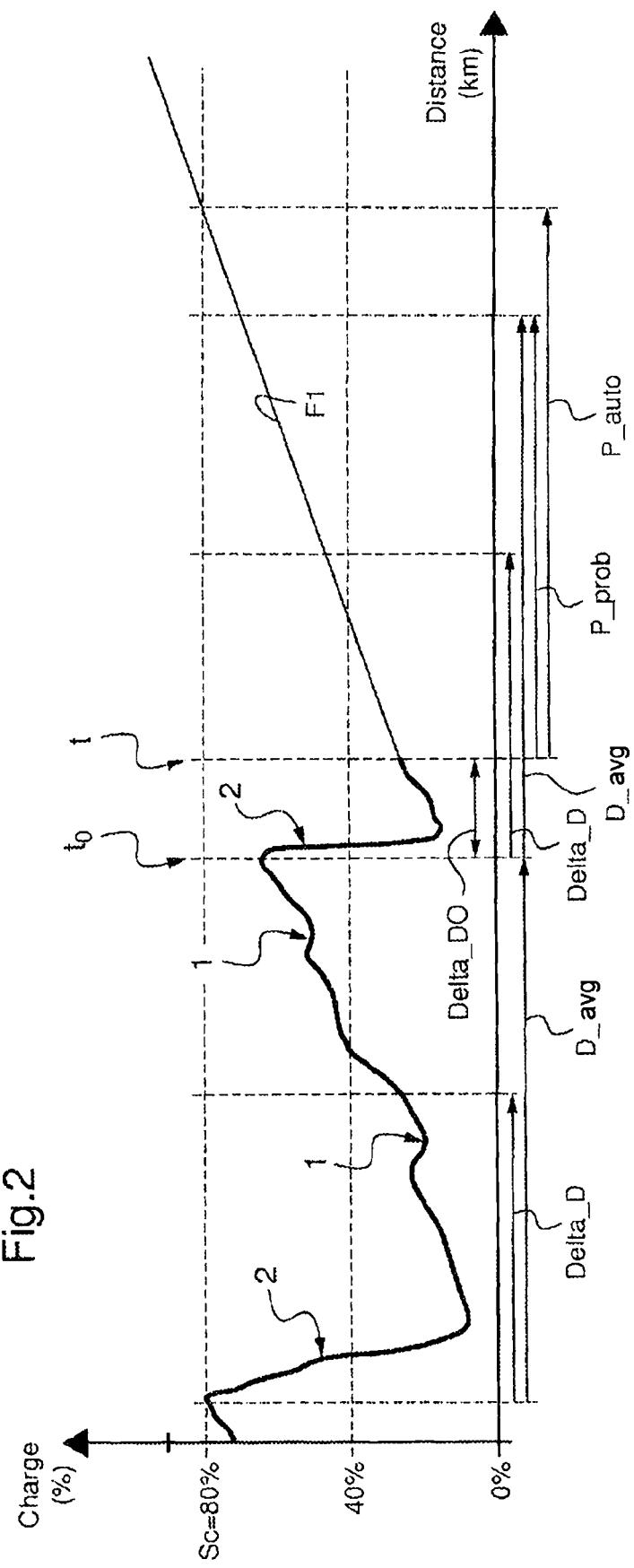
FIG. 2 is a graph representing the variation of the fill rate of a particulate filter of an engine as a function of the distance covered by the vehicle equipped with this engine.

This control unit is also designed to acquire, by means of an ad-hoc sensor, the instantaneous fill rate C_FAP of the particulate filter which, as FIG. 2 shows, varies between 0 and 100%.

As is well known, from a certain fill rate, in this case called critical fill threshold Sc, the effectiveness of the particulate filter diminishes strongly and the burnt gases leave the exhaust line with difficulty. It is then best to eliminate the particles that are clogging the filter before reaching this critical fill threshold Sc.

There are two methods for regenerating the particulate filter.

The first method, called passive regeneration, consists in exploiting the temperature and pressure conditions in the filter in order, when these conditions are favorable, to burn the particles. These favorable conditions are not, however, encountered sufficiently often for the passive regeneration occasions (reference 1 in FIG. 2) to be sufficient to eliminate all the particles retained in the filter.

The second method, called active regeneration, consists, when the filter is particularly clogged, in injecting an excess of fuel into the cylinders or directly into the exhaust line, which results in an exothermic oxidation phase of the fuel in the oxidation catalyst. The exhaust gases then leave the oxidation catalyst with a very high temperature and enter into the particulate filter burning the majority of the polluting particles with which said filter is filled. Although more effective, this method is, however, fuel-intensive and is therefore used on occasions (reference 2 in FIG. 2) that are as rare as possible.

These two methods share the fact that they can be used only when the vehicle encounters "favorable running conditions", that is to say, conditions that enable the filter to be regenerated either passively or, by default, actively with the minimum of undesirable effects, that is to say inexpensively in terms of fuel consumption, with negligible influence on the driving of the vehicle, on the environment, on the state of the various components of the vehicle, with no significant risk of regeneration runaway, etc.

In general, a running condition is all the more favorable to the regeneration of the filter when it is rapid and stable with few stops.

These favorable running conditions are in fact dependent on the architecture of the particulate filter. Each filter in fact has a fill rate band within which it must preferentially be regenerated, a minimum spacing delta_D between two active regenerations in order to avoid damaging it. As FIG. 2 shows, the filter will in this case be preferentially regenerated over a fill rate band of between 40 and 80%.

Figure 1:
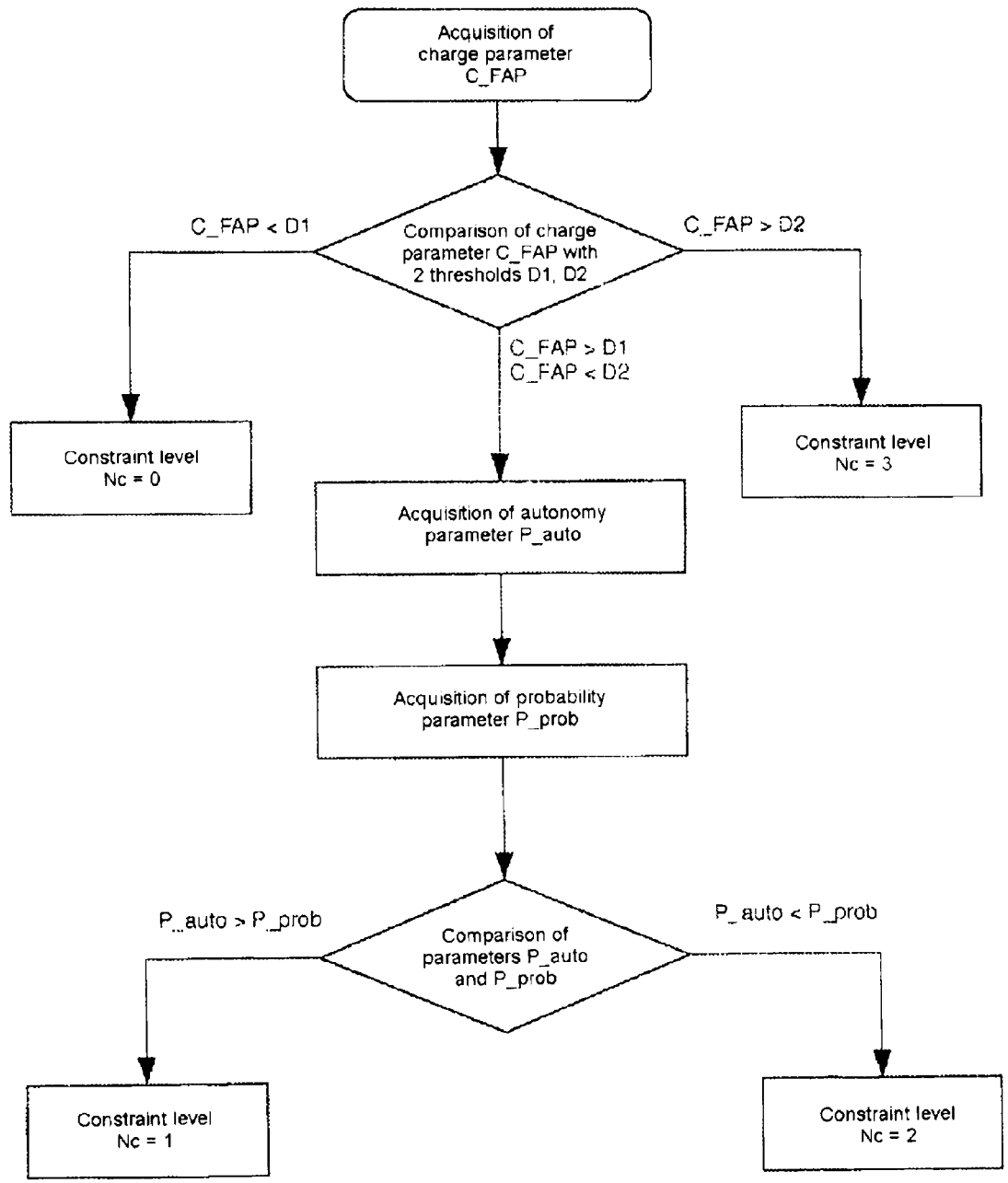
FIG. 1 is a diagram representing the steps a) and c) of the control method according to the invention.

The control unit is programmed to apply the control method represented in diagram form in FIG. 1.

This method involves three main steps which:
a) a first step of acquisition of the fill rate C_FAP of the particulate filter,
b) a second step of comparing this fill rate C_FAP with at least one determined threshold, and
c) a third step of controlling the internal combustion engine at an operating point determined according to a number of criteria of varying levels of importance.

According to a particularly advantageous characteristic of the invention, one of said criteria being the mass flow rate of particles entering into the particulate filter, prior to the step c), a coefficient (called constraint level Nc) is determined according to the result of the step b), and said coefficient is applied to the mass particle flow rate to weight the importance of this criterion in determining the operating point of the engine.

First Control Mode

More specifically in this case, during the second step b), the control unit compares the fill rate C_FAP of the filter with two thresholds D1, D2. The first threshold D1 corresponds to the fill rate of the filter below which there is a strong probability of encountering "favorable running conditions" to regenerate the filter before exceeding the critical fill threshold Sc. The second threshold D2 corresponds to the fill rate of the filter above which there is a strong probability of not encountering such "favorable running conditions" before exceeding the critical fill threshold Sc (without modifying the constraint level Nc).

These thresholds D1, D2 are predetermined, that is to say that they have values that are unchanging and are stored in the control unit. They are in this case respectively equal to 30% and 90%.

As a variant, provision can be made for these thresholds to have variable values, deduced, for example, from the usual conditions of use of the internal combustion engine. As an example, provision can be made for the first threshold to vary between 20 and 40% while the second threshold varies between 80 and 90%.

In this variant, the control unit will be designed, on the one hand, to determine the running profile of the vehicle, according to which it is generally used more on fast roads or more in town, and, on the other hand, to deduce the threshold values from this running profile. The thresholds will then have values that are all the higher when the vehicle will be used on fast roads where the running conditions are favorable to the regeneration of the filter.

Whatever the case, these thresholds D1, D2 being known, the control unit compares them with the fill rate C_FAP of the filter.

If the control unit detects that the fill rate C_FAP is below the first threshold D1, it assigns a minimum index, in this case equal to 0, to the constraint level Nc. Because of this, in the step c), the engine is controlled with no particular attention to the flow rate of particulates emitted by the engine from the cylinders. In practice, the filter is so empty that there is then a good safety margin for finding running conditions that are favorable to its regeneration before exceeding the critical fill threshold Sc. To control the engine, it will then be possible to prioritize reducing its fuel consumption.

On the other hand, if the control unit detects that the fill rate C_FAP is above the second threshold D2, it assigns a maximum index, in this case equal to 3, to the constraint level Nc. Because of this, in the step c), the engine is controlled so as to minimize the flow rate of particulates emitted by the engine from the cylinders. In practice, the filling of the filter reaches almost its critical value Sc, so that it is necessary to control the engine by prioritizing reducing particulate emissions, even if this were done to the detriment of its fuel consumption.

Finally, if the control unit detects that the fill rate C_FAP is between the two thresholds D1 and D2, it assigns an intermediate index, equal, depending on the case, to 1 or 2, to the constraint level Nc.

The choice of the index from these two values is in this case made according to the estimated probability of encountering running conditions that are favorable to regenerating the filter before exceeding its critical fill threshold Sc.

More specifically, the choice of the index is made according to the difference between two parameters to be determined, namely an autonomy parameter P_auto and a probability parameter P_prob.

The autonomy parameter P_auto in this case relates to the distance available for regenerating the particulate filter in favorable regeneration conditions (when its fill rate is between 40 and 80%, etc.).

The probability parameter P_prob relates to the distance probably needed to find running conditions suitable for the regeneration of the particulate filter.

These parameters are in this case expressed in the form of distances. Provision could, as a variant, be made for them to be expressed in the form of durations.

Whatever the case, in this case, the autonomy parameter P_auto is calculated as a function of the fill rate C_FAP of the filter, of the average speed of charge of the particulate filter and of a predetermined safety margin.

In practice, as FIG. 2 shows, at the instant t, it is possible to approximate with an affine function F1 the number of kilometers remaining before the fill rate of the filter reaches its critical threshold Sc. The coefficient governing this affine function F1 is, to this end, chosen as a function of the observed average speed of charge of the particulate filter over the latest kilometers covered, and a safety margin allowing for the case where the actual speed of charge of the filter differs from this average speed.

As a variant, this autonomy parameter P_auto could be calculated as a function of additional data, such as, for example, the distance covered since the last active regeneration of the particulate filter.

The probability parameter P_prob is calculated by means of the following formula:

$$P\_prob = \mathrm{Max}(D\_avg - \mathrm{Delta}\_D0; \mathrm{Delta}\_D), \text{ in which:}$$

D_avg corresponds to the distance generally covered by the vehicle between two instants at which the running conditions were suitable for the regeneration of the particulate filter (distance obtained by statistics);

Delta_D0 corresponds to the distance covered since the last instant to at which the running conditions were suitable for the regeneration of the particulate filter; and Delta_D corresponds to the minimum distance to be covered between two active regenerations of the filter, imposed to prevent excessively frequent regenerations, in particular in case of malfunction of the components.

Then, the control unit compares the values of these autonomy P_auto and probability P_prob parameters.

If, as is represented in FIG. 2, the control unit detects that the autonomy parameter P_auto is greater than the probability parameter P_prob, it assigns a lower index equal to 1, to the constraint level Nc. Because of this, in the step c), the setting of the engine regarding the flow rate of particulates emitted by the engine from the cylinders is not modified. In practice, the superiority of the autonomy parameter P_auto means that there is a priori a sufficient autonomy to find running conditions that are favorable to the regeneration of the filter before reaching the critical fill threshold Sc.

On the other hand, if the control unit detects that the autonomy parameter P_auto is less than the probability parameter P_prob, it assigns the higher index, in this case equal to 2, to the constraint level Nc. Because of this, in the step c), the engine is controlled so as to significantly reduce the flow rate of particulates emitted by the engine from the cylinders. In practice, if the engine were to remain controlled in this way, there would be a strong probability of the filling of the filter exceeding its critical threshold Sc before favorable running conditions were encountered.

To sum up, the control of the engine in step c) makes it possible to regulate the flow rate of particulates emitted by the engine from the cylinders as a function of the fill rate of the filter and of the probability of being able to regenerate it before exceeding its critical threshold Sc. Thus, when the control unit estimates that the quantity of particulate stored in the filter is not a concern, it controls the engine by prioritizing reducing its fuel consumption, even if this results in an increase in the flow rate of particulates emitted by the engine from the cylinders.

The present invention is in no way limited to this embodiment described and represented, and those skilled in the art will be able to apply any variant thereto in accordance with its spirit.

Second Control Mode

In particular, according to a second embodiment of the control method according to the invention, provision can be made to vary the index of the constraint level Nc continuously between 0 and 3.

In this variant, the control unit can be programmed so that, when it detects that the fill rate C_FAP is between the two thresholds D1 and D2, it assigns the constraint level Nc an index that varies continuously between 0 and 3, as a function of the difference between the autonomy P_auto and probability P_prob parameters.

More specifically, when the autonomy parameter P_auto is very much greater than the probability parameter P_prob, the index of the constraint level Nc that is assigned will tend towards 0.

On the other hand, when the autonomy parameter P_auto is very much less than the probability parameter P_prob, the index of the constraint level Nc that is assigned will tend toward 3.

Finally, when the autonomy parameter P_auto is equal to the probability parameter P_prob, the index of the constraint level Nc that is assigned will be equal to 1.5.

Third Control Mode

According to a third embodiment of the control method according to the invention, provision can be made for, during the second step b), the control unit to compare the fill rate C_FAP of the filter with a single threshold.

In this embodiment, if the control unit detects that the fill rate C_FAP is below the threshold, it assigns a minimum index to the constraint level Nc. Because of this, in the step c), the engine is controlled with no particular attention to the flow rate of particulates emitted by the engine from the cylinders.

On the other hand, if the control unit detects that the fill rate C_FAP is above the threshold, it assigns a maximum index to the constraint level Nc. Because of this, in the step c), the engine is controlled so as to minimize the flow rate of particulates emitted by the engine from the cylinders.

This control method offers the advantage of being particularly simple to apply, and therefore of being very reliable.

Fourth Control Mode

Figure 3:
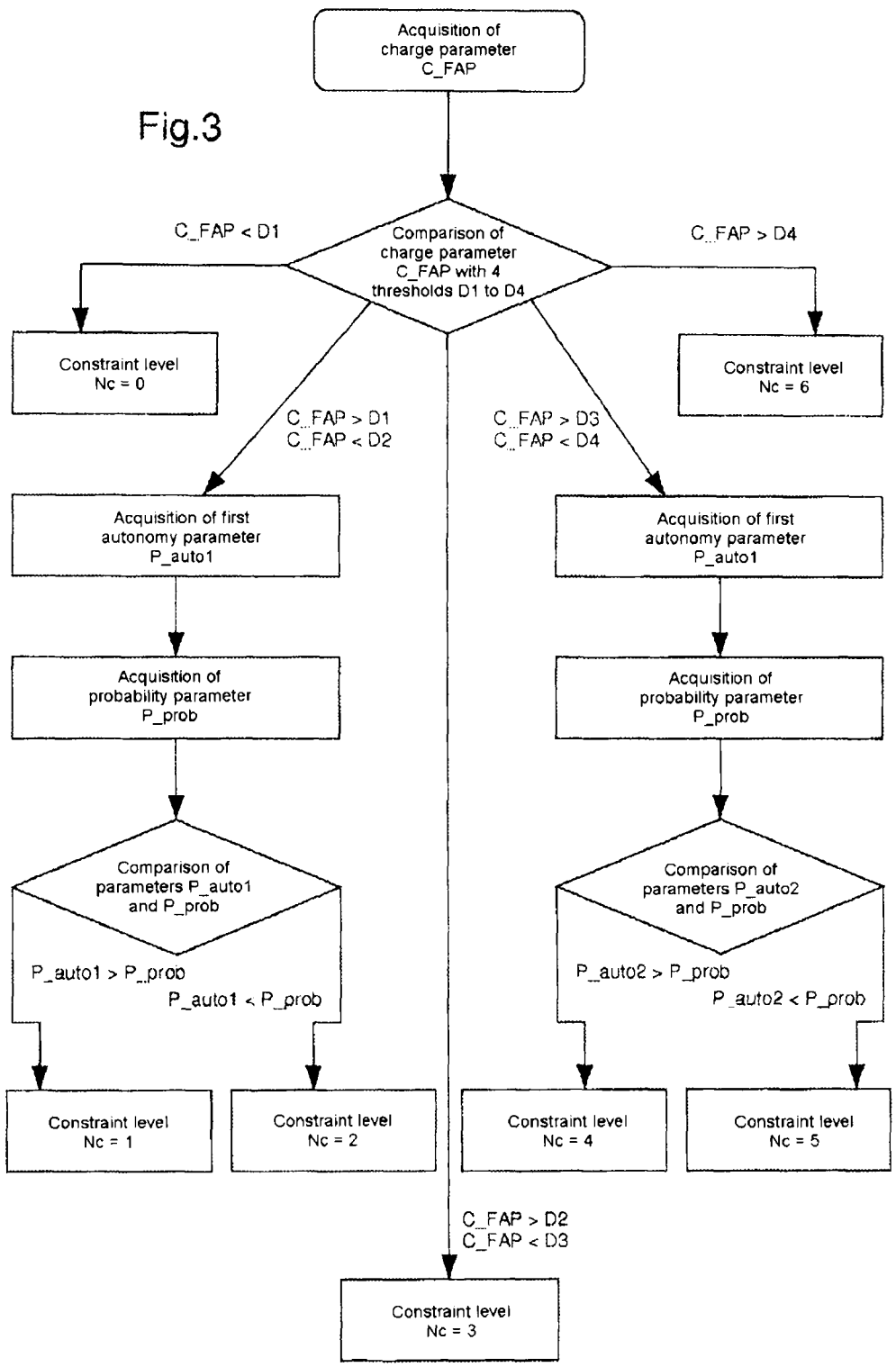
FIG. 3 is a diagram representing the steps a) and c) of a variant embodiment of the control method presented in FIG. 1.

According to a fourth embodiment of the control method according to the invention illustrated in FIG. 3, provision can be made for, during the second step b), the control unit to compare the fill rate C_FAP of the filter with four distinct thresholds D1, D2, D3, D4.

In this embodiment, the thresholds D1-D4 are predetermined or variable.

Whatever the case, if the control unit detects that the fill rate C_FAP is below the first threshold D1, it assigns a minimum index, in this case equal to 0, to the constraint level Nc. Because of this, in the step c), the engine is controlled with no particular attention to the flow rate of particulates emitted by the engine from the cylinders.

If the control unit detects that the fill rate C_FAP is above the fourth threshold D4, it assigns a maximum index, in this case equal to 6, to the constraint level Nc. Because of this, in the step c), the engine is controlled so as to minimize the flow rate of particulates emitted by the engine from the cylinders.

If the control unit detects that the fill rate C_FAP is between the two thresholds D2 and D3, it assigns an intermediate index, in this case equal to 3, to the constraint level Nc. Because of this, in the step c), because the setting of the engine regarding the flow rate of particulates emitted by the engine from the cylinders is correct, it is not modified.

If the control unit detects that the fill rate C_FAP is between the two thresholds D1 and D2, it assigns an intermediate index equal, depending on the case, to 1 or 2, to the constraint level Nc.

Finally, if the control unit detects that the fill rate C_FAP is between the two thresholds D3 and D4, it assigns an intermediate index equal, depending on the case, to 4 or 5, to the constraint level Nc.

The choice of the index from these values is, as in the first embodiment explained for the control method, made according to the estimated probability of encountering running conditions that are favorable to regenerating the filter before exceeding its critical fill threshold Sc.

More specifically, the choice of the index is made according to the difference between two parameters to be determined, namely an autonomy parameter P_auto1 or P_auto2 and a probability parameter P_prob.

The probability parameter P_prob is calculated by means of the formula explained previously. It does not therefore vary depending on the case concerned (C_FAP between D3 and D4 or between D1 and D2).

The autonomy parameter P_auto, on the other hand, is different according to the case considered. It is in fact calculated according to the fill rate C_FAP of the filter, the average speed of charge of the particulate filter and a predetermined safety margin. This safety margin will not be the same depending on whether the filter is very full (C_FAP between D3 and D4) or not very full (C_FAP between D1 and D2).

To sum up, in this embodiment, the engine will be controlled according to a wider variety of constraint levels Nc, which will make it possible to more finely control the flow rate of particulates emitted by the engine as a function of the fill rate of the filter and the probability of being able to regenerate it before it exceeds its critical threshold Sc.

The invention claimed is:

1. A method of controlling an internal combustion engine including an exhaust line fitted with a particulate filter, comprising:
   acquiring a fill rate of the particulate filter;
   comparing, simultaneously, the fill rate with at least two determined thresholds;
   when the fill rate is less than the two determined thresholds, controlling the internal combustion engine at a first operating point such that a flow rate of particulates emitted from cylinders of the engine is not modified;

when the fill rate is greater than the two determined thresholds, controlling the internal combustion engine at a second operating point such that the flow rate of particulates emitted from the cylinders of the engine is reduced;

when the fill rate is between the two determined thresholds, determining an autonomy parameter and a probability parameter, the autonomy parameter being based on a calculated distance or duration available for regenerating the particulate filter with the fill rate between the two determined thresholds and the probability parameter being based on an estimated distance or duration needed to find running conditions suitable for regenerating the particulate filter;

when the autonomy parameter is greater than the probability parameter, controlling the internal combustion engine at the first operating point; and when the autonomy parameter is less than the probability parameter, controlling the internal combustion engine at the second operating point.

2. The control method as claimed in claim 1, in which the autonomy parameter is calculated according to a charge parameter or an average charge speed of the particulate filter or a distance covered since a last active regeneration of the particulate filter or a duration that has elapsed since the last active regeneration of the particulate filter or a fill rate band within which the particulate filter can be regenerated in favorable regeneration conditions.

3. The control method as claimed in claim 1, in which the probability parameter is calculated according to a distance covered or a duration that has passed since a last instant when the running conditions were suitable for the regeneration of the particulate filter, and an average distance or an average duration between two instants when the running conditions are suitable for the regeneration of the particulate filter.

4. The control method as claimed in claim 3, in which the probability parameter is also calculated according to a minimum threshold distance or a minimum threshold duration between two active regenerations of the particulate filter.

5. The control method as claimed in claim 1, in which each threshold has a predetermined fixed value.

6. The control method as claimed in claim 1, in which each threshold has a variable value.

7. The control method as claimed in claim 6, in which the variable value is deduced from usual conditions of use of the internal combustion engine.

8. The control method as claimed in claim 1, in which the constraint level varies continuously or in levels.

9. An internal combustion engine comprising:
cylinders;
a line for intake of fresh air into the cylinders;
means of injecting fuel into the cylinders;
an exhaust line for burnt gases from the cylinders which is fitted with a particulate filter; and
a control unit for controlling flow rates of fresh air and fuel injected into the cylinders,
wherein the control unit is configured to be capable of implementing:
acquiring a fill rate of the particulate filter;
comparing, simultaneously, the fill rate with at least two determined thresholds;
when the fill rate is less than the two determined thresholds, controlling the internal combustion engine at a first operating point such that a flow rate of particulates emitted from cylinders of the engine is not modified;
when the fill rate is greater than the two determined thresholds, controlling the internal combustion engine at a second operating point such that the flow rate of particulates emitted from the cylinders of the engine is reduced;
when the fill rate is between the two determined thresholds, determining an autonomy parameter and a probability parameter, the autonomy parameter being based on a calculated distance or duration available for regenerating the particulate filter with the fill rate between the two determined thresholds and the probability parameter being based on an estimated distance or duration needed to find running conditions suitable for regenerating the particulate filter;
when the autonomy parameter is greater than the probability parameter, controlling the internal combustion engine at the first operating point; and
when the autonomy parameter is less than the probability parameter, controlling the internal combustion engine at the second operating point.

10. The control method as claimed in claim 1, in which the two determined thresholds are 30% and 90%, respectively.

11. The control method as claimed in claim 1, in which the two determined thresholds includes a first determined threshold that varies between 20 and 40% and a second determined threshold that varies between 80 and 90%.

12. The control method as claimed in claim 1, further comprising:
determining a running profile of the vehicle,
wherein the two determined thresholds are determined from the running profile of the vehicle.

13. The control method as claimed in claim 1, in which the determining the autonomy parameter and the probability parameter is performed after the comparing, simultaneously, the fill rate with the at least two determined thresholds.

* * * * *